(12) United States Patent
Loewenstein et al.

(10) Patent No.: US 8,972,663 B2
(45) Date of Patent: Mar. 3, 2015

(54) BROADCAST CACHE COHERENCE ON PARTIALLY-ORDERED NETWORK

(71) Applicant: Oracle International Corporation, Redwood Shores, CA (US)

(72) Inventors: Paul N. Loewenstein, Palo Alto, CA (US); Stephen E. Phillips, Los Gatos, CA (US); David Richard Smentek, Cupertino, CA (US); Connie Wai Mun Cheung, Sunnyvale, CA (US); Serena Wing Yee Leung, San Francisco, CA (US); Damien Walker, Redwood City, CA (US); Ramaswamy Sivaramakrishnan, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 177 days.

(21) Appl. No.: 13/830,967

(22) Filed: Mar. 14, 2013

(65) Prior Publication Data

US 2014/0281237 A1 Sep. 18, 2014

(51) Int. Cl.
*G06F 12/00* (2006.01)
*G06F 12/08* (2006.01)

(52) U.S. Cl.
CPC ........ *G06F 12/0808* (2013.01); *G06F 12/0811* (2013.01); *G06F 12/0817* (2013.01); *G06F 12/0828* (2013.01)
USPC ................... 711/122; 711/141; 711/E12.024; 711/E12.026

(58) Field of Classification Search
USPC ................................. 711/122, 141
See application file for complete search history.

(56) References Cited

U.S. PATENT DOCUMENTS

| 5,297,269 | A | 3/1994 | Donaldson et al. |
| 5,905,998 | A | 5/1999 | Ebrahim et al. |
| 7,003,631 | B2 * | 2/2006 | Rowlands ............ 711/141 |
| 7,600,080 | B1 | 10/2009 | Bhattacharyya et al. |

FOREIGN PATENT DOCUMENTS

EP     0801349 A1     10/1997

OTHER PUBLICATIONS

International Search Report and Written Opinion for PCT/US2014/024751dated Aug. 7, 2014 (10 pages).

* cited by examiner

*Primary Examiner* — Aracelis Ruiz
(74) *Attorney, Agent, or Firm* — Osha Liang LLP

(57) ABSTRACT

A method for cache coherence, including: broadcasting, by a requester cache (RC) over a partially-ordered request network (RN), a peer-to-peer (P2P) request for a cacheline to a plurality of slave caches; receiving, by the RC and over the RN while the P2P request is pending, a forwarded request for the cacheline from a gateway; receiving, by the RC and after receiving the forwarded request, a plurality of responses to the P2P request from the plurality of slave caches; setting an intra-processor state of the cacheline in the RC, wherein the intra-processor state also specifies an inter-processor state of the cacheline; and issuing, by the RC, a response to the forwarded request after setting the intra-processor state and after the P2P request is complete; and modifying, by the RC, the intra-processor state in response to issuing the response to the forwarded request.

20 Claims, 13 Drawing Sheets

TABLE 2.1

| State | Description |
|---|---|
| M | Exclusive and modified |
| O | Shared and modified |
| E | Exclusive and unmodified |
| S | Shared and unmodified |
| I | Invalid |

} Inter-processor States

TABLE 2.2

| Inter-Processor State | Exclusive Within Processor | Non-Exclusive Within Processor |
|---|---|---|
| M | $M_c$ | $D_c$ |
| O | $R_c$ | $O_c$ |
| E | $E_c$ | $X_c$ |
| S | $P_c$ | $Q_c$ |

Intra-processor States

TABLE 2.3

| Inter-Processor State | Gateway Tag State |
|---|---|
| M or E | $E_g$ |
| O or S | $S_g$ |
| I | $I_g$ |

FIG. 2B

TABLE 3.1

| Request | Description |
|---|---|
| pRTS | Request for read access to a cacheline |
| pRTO | Request for read-write access to a cacheline |

TABLE 3.2

| Response | Description |
|---|---|
| Ack | Positive acknowledgement |
| Nack | Negative ackowledgement |
| DataM | Cacheline of data with inter-processor state M |
| DataO | Cacheline of data with inter-processor state O |
| DataE | Cacheline of data with inter-processor state E |
| DataS | Cacheline of data with inter-processor state S |

TABLE 3.3

| Current State | Response | pRTS New State | pRTO New State |
|---|---|---|---|
| $D_c$ or $M_c$ | DataM | $S_c$ | $I_c$ |
| $O_c$ or $R_c$ | DataO | $S_c$ | $I_c$ |
| $X_c$ or $E_c$ | DataE | $S_c$ | $I_c$ |
| $Q_c$ or $P_c$ | DataS | $S_c$ | $I_c$ |
| $S_c$ | Ack | $S_c$ | $I_c$ |
| $I_c$ | Ack | $I_c$ | $I_c$ |

TABLE 3.4

| Response | New State |
|---|---|
| DataM | $D_c$ |
| DataO | $O_c$ |
| DataE | $X_c$ |
| DataS | $Q_c$ |

TABLE 3.5

| Current State | New State |
|---|---|
| $D_c$ | $M_c$ |
| $O_c$ | $R_c$ |
| $X_c$ | $E_c$ |
| $Q_c$ | $P_c$ |

FIG. 3B

TABLE 5.1

| Request | Description |
|---|---|
| fRTS | Request for read access to a cacheline |
| fRTO | Request for read-write access to a cacheline |

TABLE 5.2

| Current State | Response | fRTS New State | fRTO New State |
|---|---|---|---|
| $D_c$ or $M_c$ | DataM | $S_c$ | $I_c$ |
| $O_c$ or $R_c$ | DataO | $S_c$ | $I_c$ |
| $X_c$ or $E_c$ | DataE | $S_c$ | $I_c$ |
| $Q_c$ or $P_c$ | DataS | $S_c$ | $I_c$ |
| $S_c$ | Ack | $S_c$ | $I_c$ |
| $I_c$ | Ack | $I_c$ | $I_c$ |

TABLE 5.3

| Request | Description |
|---|---|
| fCPB | Request for read access to a cacheline (another processor's RTS) |
| fCPI | Request for read-write access to a cacheline (another processor's RTO) |
| fINV | Request to invalidate a cacheline (contents not required from this processor) |
| fCPD | Request for a read-once snapshot of a cacheline (typically for DMA) |

TABLE 5.4

| Current State | fCPB | fCPI | fINV | fCPD |
|---|---|---|---|---|
| $D_c$ or $M_c$ | DataM | DataM | AckM | DataM |
| $O_c$ or $R_c$ | DataO | DataO | AckO | DataO |
| $X_c$ or $E_c$ | DataE | DataE | AckE | DataE |
| $Q_c$ or $P_c$ | DataS | DataS | AckS | DataS |
| $S_c$ | Ack | Ack | Ack | Ack |
| $I_c$ | Ack | Ack | Ack | Ack |

TABLE 5.5

| Current State | fCPB | fCPI | fINV | fCPD |
|---|---|---|---|---|
| $D_c$ or $M_c$ | $S_c$ | $I_c$ | $I_c$ | No Change |
| $O_c$ or $R_c$ | $S_c$ | $I_c$ | $I_c$ | No Change |
| $X_c$ or $E_c$ | $S_c$ | $I_c$ | $I_c$ | No Change |
| $Q_c$ or $P_c$ | $S_c$ | $I_c$ | $I_c$ | No Change |
| $S_c$ | $S_c$ | $I_c$ | $I_c$ | $S_c$ |
| $I_c$ | $I_c$ | $I_c$ | $I_c$ | $I_c$ |

FIG. 5

TABLE 6.1

| Current State | Response | New State |
|---|---|---|
| Supplier | Nack | Same |
| $S_c$ | Nack | $I_c$ |
| $S_c$ | AckWB[1] | $S_c$ |
| $I_c$ | Nack | $I_c$ |
| $I_c$ | PullWB | $I_c$ |

TABLE 6.2

| Current State | AckWB Response | PullWB response |
|---|---|---|
| $D_c$ or $M_c$ | AckM | DataM |
| $O_c$ or $R_c$ | AckO | DataO |
| $X_c$ or $E_c$ | AckE | DataE |
| $Q_c$ or $P_c$ | AckS | DataS |
| $I_c$ | Nack | Nack |

TABLE 6.3

| Received Response | New Cacheline State |
|---|---|
| AckM | $D_c$ |
| AckO | $O_c$ |
| AckE | $X_c$ |
| AckS | $Q_c$ |
| DataM | $M_c$ |
| DataO | $R_c$ |
| DataE | $E_c$ |
| DataS | $P_c$ |
| Nack | No Change |

FIG. 6C

BROADCAST CACHE COHERENCE ON PARTIALLY-ORDERED NETWORK

BACKGROUND

In computing, cache coherence or cache coherency refers to the consistency of data stored in local caches of a shared resource. When clients in a system maintain caches of a common memory resource, problems may arise with inconsistent data. This is particularly true of CPUs in a multiprocessing system. Cache coherence is intended to maintain consistency both between caches and between the caches and memory so that the presence of the caches is essentially invisible to the system programmer except for their effect on performance.

SUMMARY

In general, in one aspect, the invention relate to a method for cache coherence. The method comprises: broadcasting, by a cache agent of a first requester cache (RC) over a partially-ordered request network of a local processor, a first peer-to-peer (P2P) request for a cacheline to a plurality of cache agents of a plurality of slave caches on the local processor; receiving, by the cache agent of the first RC and over the partially-ordered request network while the first P2P request is pending, a forwarded request associated with the cacheline from a local gateway on the local processor, wherein the local gateway is operatively connected to a foreign gateway on a foreign processor, wherein the cache agent of the first RC delays responding to the forwarded request because the first P2P request is pending; receiving, by the cache agent of the first RC and after receiving the forwarded request, a plurality of responses to the first P2P request from the plurality of cache agents of the plurality of slave caches; setting, by the cache agent of the first RC and after receiving the plurality of responses, an intra-processor state of the cacheline in the first RC, wherein the intra-processor state also specifies an inter-processor state of the cacheline associated with the local processor and the foreign processor; and issuing, by the cache agent of the first RC, a response to the forwarded request after setting the intra-processor state and after the first P2P request is complete; and modifying, by the cache agent of the first RC, the intra-processor state in response to issuing the response to the forwarded request.

In general, in one aspect, the invention relates to a method for cache coherence. The method comprises: broadcasting, by a cache agent of an evicting cache (EC) over a partially-ordered request network on a local processor, a peer-to-peer (P2P) writeback request for a cacheline to a plurality of cache agents of a plurality of slave caches on the local processor; receiving, by the cache agent of the EC over the partially-ordered request network and while the P2P writeback request is still pending, a first forwarded request for the cacheline from a local gateway on the local processor, wherein the local gateway is operatively connected to a foreign gateway on a foreign processor, and wherein the cache agent of the EC delays responding to the first forwarded request while the P2P writeback request is still pending to ensure that only one P2P writeback request is active for the cacheline on the local processor; receiving, by the cache agent of the EC, a plurality of responses from the cache agents of the plurality of slave caches; issuing, by the cache agent of the EC, a response to the first forwarded request after receiving the plurality of responses from the cache agents of the plurality of slave caches and after the P2P writeback request is complete; and issuing, by the cache agent of the EC and after issuing the response to the first forwarded request, a plurality of responses to the cache agents of the plurality of slave caches.

In general, in one aspect, the invention relates to a system for cache coherence. The system comprises: a foreign processor; and a local processor comprising: a plurality of cache agents of a plurality of local slave caches; a first partially-ordered request network operatively connecting the plurality of cache agents of the plurality of local slave caches; and a cache agent of a requester cache (RC) configured to: broadcast a peer-to-peer (P2P) request for a first cacheline over the first partially-ordered request network to the plurality of cache agents of the plurality of local slave caches; receive, while the P2P request is pending, a forwarded request associated with the first cacheline over the partially-ordered request network; set, in the RC and after the forwarded request is received, an intra-processor state of the cacheline based on a response to the P2P request, wherein the intra-processor state also specifies an inter-processor state of the cacheline associated with the local processor and the foreign processor; and issue a response to the forwarded request after the intra-processor state is set and after the P2P request is completed, wherein the response to the forwarded request is delayed while the P2P request is pending.

Other aspects of the invention will be apparent from the following description and the appended claims.

BRIEF DESCRIPTION OF DRAWINGS

FIG. 2B shows gateway tags in accordance with one or more embodiments of the invention.

FIG. 3B shows a set of tables in accordance with one or more embodiments of the invention.

FIG. 5 shows a set of tables in accordance with one or more embodiments of the invention.

FIG. 6C shows a set of tables in accordance with one or more embodiments of the invention.

DETAILED DESCRIPTION

Figure 1:
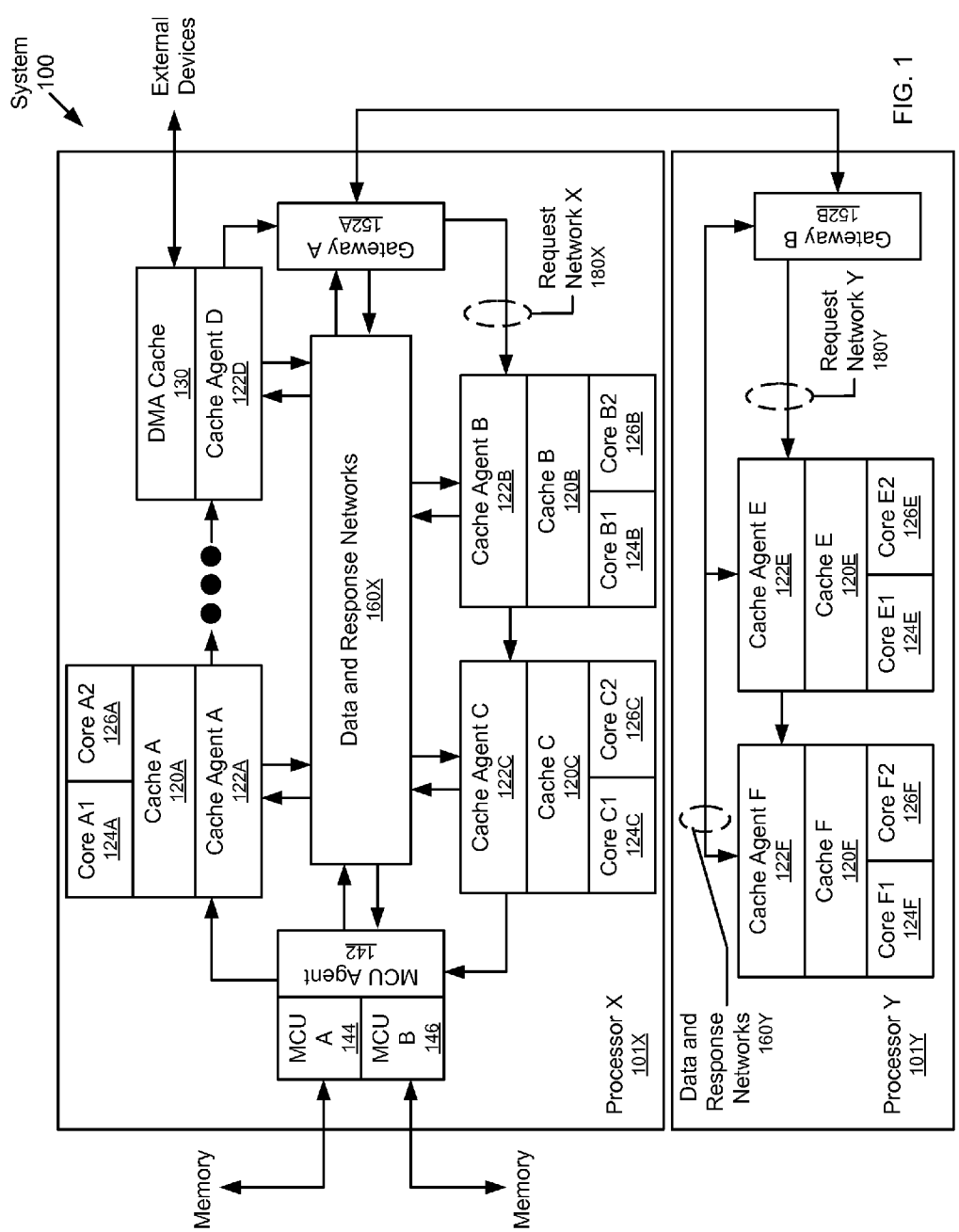
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for cache coherence. Specifically, multiple processors exist and each processor has multiple caches. Each processor also has a gateway connected to the gateways of other processors. Cache coherency between processors is maintained using an inter-processor coherence protocol. On a single processor, cache coherency between the multiple caches of the processor is maintained using a request network having an ordering property. This ordering property is used to guarantee forward progress of requests to obtain access rights (e.g., read only, read/write, etc.) to a cacheline. Moreover, a unified cache view is presented to the inter-processor coherence protocol, which is unaware of the multiplicity of caches on each processor.

FIG. 1 shows a system (100) in accordance with one or more embodiments of the invention. As shown in FIG. 1, there exist multiple processors (e.g., Processor X (101X), Processor Y (101Y)). The multiple processors may be located on the same chip or on different chips. Each processor (101X, 101Y) includes multiple cores operatively connected to multiple caches. For example, processor X (101X) includes core A1 (124A) and core A2 (126A) operatively connected to cache A (120A); core B1 (124B) and core B2 (126B) operatively connected to cache B (120B); and core C1 (124C) and core C2 (126C) operatively connected to cache C (120C). Similarly, in processor Y (101Y), core F1 (124F) and core F2 (126F) are operatively connected to cache F (120F); and core E1 (124E) and core E2 (126E) are operatively connected to cache E (120E). Each processor (101X, 101Y) also includes a gateway (e.g., Gateway A (152A), Gateway B (152)) (discussed below) operatively connected to the gateways (152A, 152B) of other processors (101X, 101Y).

Still referring to FIG. 1, processor X (101X) includes a Direct Memory Access (DMA) Cache (130) operatively connected to one or more external (i.e., off-processor) devices and one or more memory controller units (MCUs) (e.g., MCU A (144), MCU B (146)) for communicating with off-processor main memory. Processor Y (101Y) may also include a DMA (not shown) and one or more MCUs (not shown).

In order to successfully execute instructions, the processor cores (124A-C, 124E, 124F, 126A-C, 126E, 126F) and/or external devices frequently access (e.g., read from and/or write to) one or more memory addresses in main memory. In order to expedite execution of these instructions, the contents of some memory addresses may be locally stored in the caches (120A-C, 120E, 120F), which have faster access times than main memory. If a cache (120A-C, 120E, 120F) is not storing the contents of a required memory address, or if the contents of the memory address are not stored in the cache (120A-C, 120E, 120F) in the required state (discussed below), a cache miss has occurred.

In one or more embodiments of the invention, each processor (101X, 101Y) includes multiple cache agents operatively connected to the caches (120A-C, 120E, 120F). Specifically, processor X (101X) includes cache agent A (122A) operatively connected to cache A (120A); cache agent B (122B) operatively connected to cache B (120B); and cache agent C (122C) operatively connected to cache C (120C). Similarly, processor Y (101Y) includes cache agent F (122F) operatively connected to cache F (120F); and cache agent E (122E) operatively connected to cache E (120E). Cache Agent D (122D) is operatively connected to the DMA Cache (130).

In one or more embodiments of the invention, the cache agents (122A-E) are configured to broadcast, in response to cache misses or in order to transfer control of a cacheline, peer-to-peer requests of various types to other cache agents (122A-E) on the same processor (101X, 101Y) and process the responses (from the other cache agents) to the P2P requests. Similarly, the cache agents (122A-E) are also configured to listen for (i.e., receive) broadcast P2P requests of various types and issue responses to the P2P requests.

In one or more embodiments of the invention, the processor on which a P2P request, a forwarded request, and/or a mediated request originates is referred to as the local processor. The caches and gateway(s) on the local processor are referred to as the local caches and the local gateway(s), respectively. The other processor(s) in the system (100) are referred to as foreign processors. The caches and the gateway(s) on the foreign processors are referred to as foreign caches and foreign gateways, respectively.

In one or more embodiments of the invention, the cache agents (122A-E) are configured to issue mediated requests of various types to the local gateway on the same processor as the cache agent. For example, cache agents (122A-D) issue mediated requests of various types to Gateway A (152A). Similarly, cache agent E (122E) and cache agent F (122F) issue mediated requests of various types to Gateway B (152B). The cache agents (122A-E) are also configured to listen for (i.e., receive) forwarded requests from the gateway (152A, 152B) on the same processor as the cache agent (122A-E).

Still referring to FIG. 1, on processor X (101X), gateway A (152A), the MCU Agent (142), and the multiple cache agents (122A-D) are operatively connected by request network X (180X). On processor Y (101Y), gateway B (152B) and the multiple cache agents (122E, 122F) are connected by request network Y (180Y). In one or more embodiments of the invention, request network X (180X) and request network Y (180Y) are identical. Both request network X (180X) and request network Y (180Y) may be used to broadcast P2P requests and forwarded requests. Each request network (180X, 180Y) has the ordering property that if a cache agent sends a packet B after seeing a packet A for the same cacheline address, then no cache agent on the request network sees packet B before packet A. Accordingly, one possible implementation for each request network (180X, 180Y) is one or more unidirectional rings.

In one or more embodiments of the invention, each processor (101X, 101Y) includes data and response networks (160X, 160Y) for transmitting responses to P2P requests and the data (i.e., cacheline) associated with some responses. In one or more embodiments of the invention, at least one network in the data and response networks (160X, 160Y) is a single-driver-per-track free-running pipeline network for point-to-point responses. In one or more embodiments of the invention, the data and response networks (160X, 160Y) are identical. Although the data and response networks (160X, 160Y) are logically separate from the request networks (180X, 180Y), transmission of responses and data may be executed over the same physical network as the requests.

In one or more embodiments of the invention, each processor (101X, 101Y) includes a network for transmitting mediated requests from the caches to the gateway (152A, 152B). These networks may share resources with the request networks (180X, 180Y) and/or the data and response networks (160X, 160Y)

Although FIG. 1 shows only two processors (i.e., Processor X (101X), Processor Y (101Y)), the system (100) may have any number of processors. Further, although processor X (101X) only shows three caches (i.e., Cache A (120A), Cache B (120B), Cache C (120C)), each processor may have any number of caches. Further still, although FIG. 1 shows only two cores operatively connected to each cache, there may be any number of cores attached to each cache. Moreover, different caches may be attached to different numbers of cores.

Further, although FIG. 1 only shows one gateway per processor, in one or more embodiments of the invention, a single processor has multiple gateways. In such embodiments, each gateway of the multiple gateways on the processor is responsible for a portion of the cachelines. In other words, requests associated with a given cacheline are only handled by one predetermined gateway of the multiple gateways on the processor.

Figure 2A:
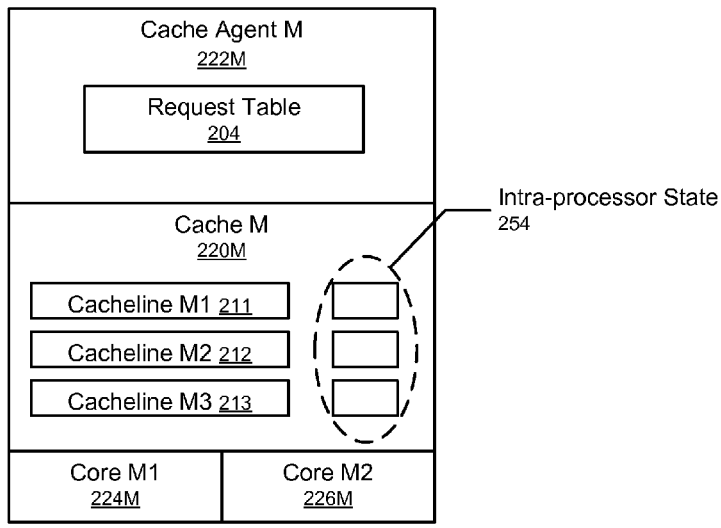
FIG. 2A shows a cache agent and a cache in accordance with one or more embodiments of the invention.

FIG. 2A shows cache agent M (222M), cache M (220M), and multiple cores (i.e., Core M1 (224M), Core M2 (226M)) in accordance with one or more embodiments of the invention. Cache agent M (222M) may correspond to any of the cache agents (122A-C, 122E, 122F) discussed above in reference to FIG. 1. Further, cache M (220M) may correspond to any of the caches (120A-C, 120E, 120F) discussed above in reference to FIG. 1. Further still, the cores (224M, 226M) may correspond to any of the cores (224A-C, 224E, 224F, 226A-C, 226E, 224F) discussed above in reference to FIG. 1.

Cache M (220M) stores multiple cachelines (i.e., Cacheline M1 (211), Cacheline M2 (212), Cacheline M3 (213)). Each cacheline (211, 212, 213) corresponds to one or more memory addresses in main memory. Further, each cacheline (211, 212, 213) may also be held by another cache in the system (100). In one or more embodiments of the invention, cache agent M (222M) includes a request table (204) to store any forwarded requests (issued by the local gateway) for a cacheline while a P2P request for the same cacheline is pending (discussed below).

As discussed above, the system (100) includes multiple processors. As also discussed above, cache coherency between processors is maintained using an inter-processor coherence protocol (e.g., by using MOESI states). Table 2.1 in FIG. 2A shows the possible inter-processor states for each MOESI state.

For each individual cache (e.g., Cache M (220M)) within the processor, additional states (i.e., intra-processor states) are used to indicate whether the cache is the sole cache within the processor holding the cacheline. Cache M (220M) records the intra-processor state (254) for each cacheline. This is required for inter-processor states M and E, because before modifying the contents of a cacheline, the cacheline must be held exclusively within the processor as well as between processors. In one or more embodiments of the invention, corresponding additional states are also needed for inter-processor states O and S during writeback processing.

Table 2.2 in FIG. 2A shows the intra-processor cache states that define the inter-processor cache state of the processor. These states are known as "supplier" states. There are two intra-processor states for each inter-processor state to distinguish whether the cacheline is held exclusively within the processor. For example, as shown in Table 2.2, the intra-processor states $M_C$ and $D_C$ are used for inter-processor state M to distinguish whether the cacheline is held exclusively within the processor. A cache may also hole a cacheline in state $S_C$ in which case the cacheline is either held in a nonexclusive supplier state in another cache or the cacheline is in transit from a cache that held the line in a nonexclusive supplier state to anther cache. Although not shown in FIG. 2A, intra-processor state $I_C$ indicates that the cache does not hold the cacheline.

Within a processor, only one cache (the supplier cache) holds the cacheline in a state indicating the inter-processor state; if that state is non-exclusive within the processor (i.e., in state $D_C$, $O_C$, $X_C$ or $Q_C$), other caches on the same processor may hold the line in state $S_C$, which conveys no inter-processor state information (except that it is not I).

Gateway Tags

In one or more embodiments of the invention, the gateway can maintain its own copy of the inter-processor state for a cacheline using gateway tags. Table 2.3 in FIG. 2B shows different gateway tag states corresponding to different inter-processor states. The gateway tag states may or may not keep track of inter-processor exclusivity. As discussed above, in one or more embodiments of the invention, a single processor has multiple gateways. In such embodiments, only the gateway corresponding to the cacheline holds a gateway tag for the cacheline.

Peer-to-Peer (P2P) Requests

In one or more embodiment of the invention, the caches on a processor can transfer cachelines (211, 212, 213) between themselves via a P2P protocol which maintains inter-cache coherence but can neither change the aggregate access rights of the processor nor guarantee forward progress. In one or more embodiments of the invention, to change aggregate access rights or to guarantee forward progress, a cache makes a request through the local gateway (i.e., the gateway on the same processor as the cache). The local gateway makes any necessary inter-processor request and broadcast to the other caches on the processor (discussed below).

Figure 3A:
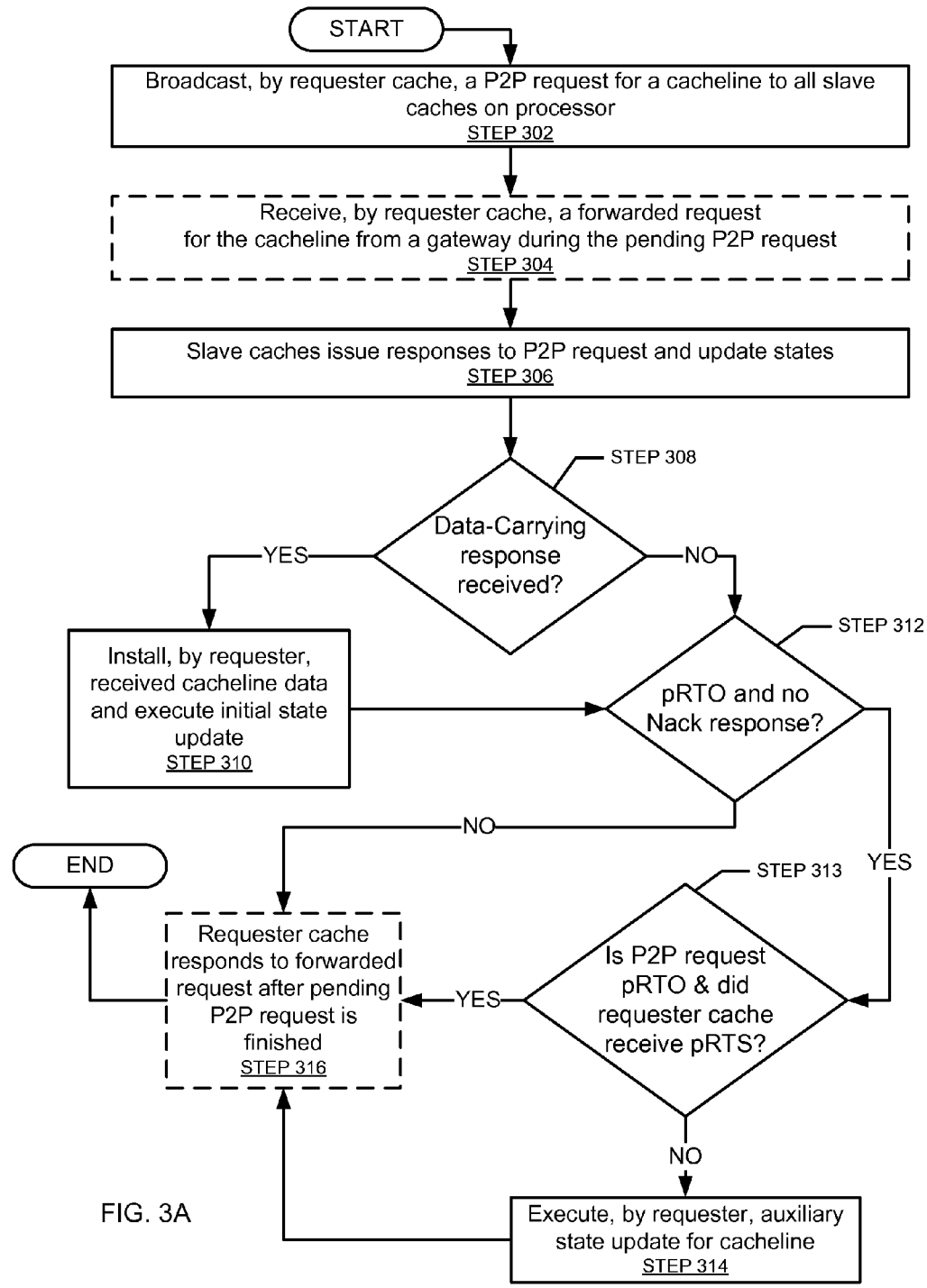
FIG. 3A shows a flowchart in accordance with one or more embodiments of the invention.

FIG. 3A shows a flowchart in accordance with one or more embodiments of the invention. The flowchart in FIG. 3A describes a P2P request for a cacheline and an interaction of the P2P request with a forwarded request from a gateway. The process shown in FIG. 3A may be executed, for example, by one or more components in system (100), discussed above in reference to FIG. 1. One or more steps shown in FIG. 3A may be omitted, repeated, and/or performed in a different order among different embodiments of the invention. Accordingly, embodiments of the invention should not be considered limited to the specific number and arrangement of steps shown in FIG. 3A.

Peer-to-peer allocating transactions attempt to obtain access rights to a cacheline by obtaining them from another cache on the same processor. Peer-to-peer requests therefore may fail because the other caches may not have the cacheline with the desired access rights. Also, because the protocol broadcasts eagerly, with no serialization point for requests for the same cacheline, conflicts between concurrently issued requests by different caches may cause request failure, even if other caches have the desired access rights.

Initially, the cache agent of the requester cache broadcasts the P2P request for a cacheline to the other caches (i.e., slave caches) on the processor (STEP 302). The P2P request is broadcast over the partially-ordered request network of the processor. The P2P request may also be received by the local gateway on the processor. Table 3.1 in FIG. 3B shows two possible types of P2P requests.

In STEP 304, the cache agent of the requester cache receives a forwarded request for the cacheline. The forwarded request is from the local gateway on the processor. Moreover, the forwarded request is received while the P2P request for the cacheline is still pending. The cache agent may store the forwarded request for later processing (i.e., the cache agent delays a response to the forwarded request). Because the forwarded request is generated by the gateway, the cache agent has no control over when the forwarded request is received. It could be received before any response from a slave cache or after some responses have been received.

In STEP 306, the cache agents of the slave caches issue responses to the P2P request. Specifically, the cache agent of each slave cache issues a single response to the P2P request. The single response may be based on the type of the P2P request and/or the intra-processor state in which the slave cache holds the cacheline. Moreover, following the cache's/cache agent's response, the intra-processor state for the cacheline in the slave cache may be updated based on the type of the P2P request. Table 3.3 in FIG. 3B shows the response by the cache agent of a slave cache to a P2P request. Table 3.3 in FIG. 3B also shows the new state of the cacheline in the slave cache following the response. For example, if the P2P request is pRTS and the slave cache holds the cacheline in $X_C$, the cache agent of the slave cache responds with DataE and the intra-processor state of the cacheline in the slave cache is set to $S_C$. Table 3.2 in FIG. 3B describes the various types of responses.

In one or more embodiments of the invention, if a slave has a pending request for the cacheline when it receives a request for the same cacheline from another cache, it responds with a negative acknowledgment (Nack) and undergoes no state change. A slave may also respond with Nack for other reasons, such as resource conflicts or imprecision in determining the existence of a pending request. Any data-carrying response (e.g., DataM, DataO, DataE, DataS) carries the contents of the cacheline held by the slave cache.

Responding to the P2P request requires no score boarding by the cache agent of the slave cache and is made unconditionally, without waiting for the servicing of any requests that the cache agent of the slave cache may have issued.

In STEP 308, once the cache agent of the request cache receives all the responses to the P2P request from the slave caches, it is determined whether a data-carrying response was received. When it is determined that a data-carrying response was received, the process proceeds to STEP 310. When it is determined that no data-carrying response was received (e.g., the P2P request was a pRTO and the requestor cache already held the cacheline in a supplier state), the processes proceeds to STEP 312.

In STEP 310, the cacheline data is installed in the requester cache and an initial intra-processor state for the cacheline is set. This new state is based on the type of data-carrying response received from the slave cache, or in the case of the requester being in a supplier state, the original state of the requester (e.g., the requester cache already held the cacheline in intra-processor state $X_C$ and issued a pRTO to attain state $E_C$). Table 3.4 in FIG. 3B shows the new state for the cacheline based on the type of data-carrying response received from slave cache. For example, as shown in FIG. 3B, if the data-carrying response is DataE, the new state is $X_C$.

In STEP 312, if the P2P request was pRTO and no Nack response was received, the process proceeds to STEP 313. However, if the P2P request was pRTS, or if the P2P request was pRTO and a Nack response was received, the process proceeds to STEP 316.

In STEP 313, it is determined whether the P2P request was pRTO and the requester cache received pRTS while the P2P request (i.e., pRTO) was pending. When the conditions of STEP 313 are TRUE, STEP 314 is skipped to avoid violating the exclusivity property (discussed below), and the P2P request (i.e., pRTO) is deemed a failure. The process then proceeds to STEP 316. However, when the conditions of STEP 313 are FALSE, the process proceeds to STEP 314.

In STEP 314, an auxiliary update to the intra-processor state of the cacheline in the requester cache is executed. The new intra-processor state of the cacheline is based on the current (i.e., STEP 310) intra-processor state of the cacheline. Table 3.5 in FIG. 3B shows the new state, following the auxiliary update, for the cacheline based on current intra-processor state. It should be clear to someone skilled in the art, having the benefit of this detailed description, that the updates in STEP 310 and STEP 314 could be merged into a single update.

In STEP 316, the P2P request is no longer pending (i.e., the P2P request is complete or deemed a failure) and the cache agent of the requester cache responds to the forwarded request.

In view of the process shown in FIG. 3A and the tables in FIG. 3B, when one cache takes a cacheline from another cache in the same processor: (1) the data and inter-processor state is transferred in the response from the supplying cache to the destination cache; (2) the sourcing cache loses its supplier status; and (3) the destination cache becomes the supplier. Therefore at all times the inter-processor state is stored either in the supplier cache, or in a response from one cache to another. P2P transactions by themselves do not change the inter-processor state.

A cacheline held in state $M_C$, $R_C$, $E_C$, or $P_C$ implies the cacheline is held in no other cache on the processor. P2P requests maintain this property as follows: (1) the only P2P request that can place the cacheline in an intra-processor exclusive state is a successful pRTO; (2) a successful pRTO invalidates all other caches; (3) any request by a slave to regain the cacheline is ordered after the pRTO at all caches by the request network ordering properties, so that request cannot affect the outcome of the pRTO; (4) if the pRTO is successful, any regaining of access rights to the cacheline by another cache on the processor must be via the pRTO requester, which loses its exclusive state when it services the request after finishing the pRTO; (5) so while the pRTO requester holds the line in state $M_C$, $R_C$, $E_C$, or $P_C$, no other cache in the processor holds the cacheline.

Local and Foreign Forwarded Requests

Figure 4A:
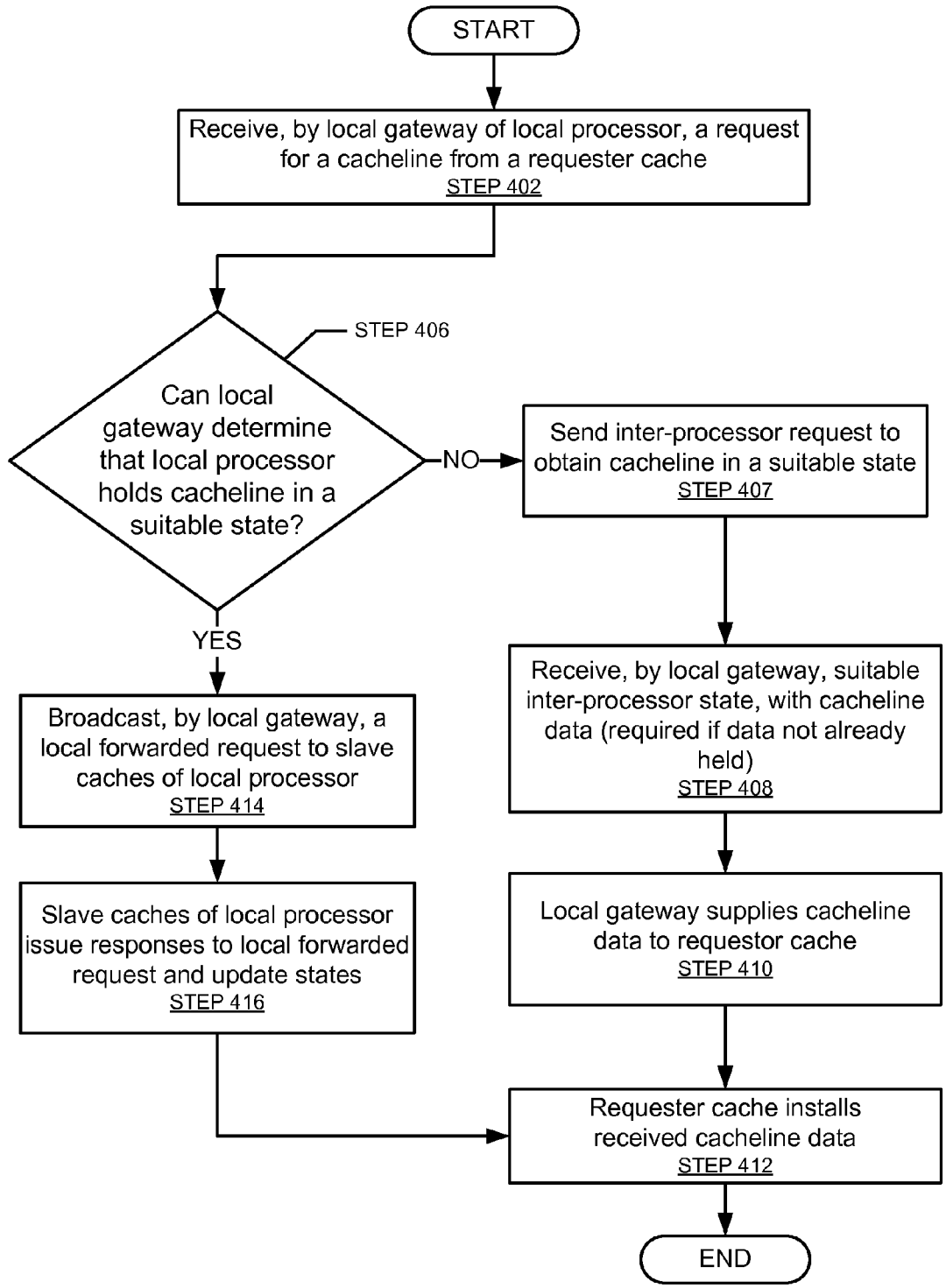
FIG. 4A, FIG. 4B, and FIG. 4C show flowcharts in accordance with one or more embodiments of the invention.

FIG. 4A shows a flowchart in accordance with one or more embodiments of the invention. The flowchart in FIG. 4A describes a local forwarded request for a cacheline. The process shown in FIG. 4A may be executed, for example, by one or more components in system (100), discussed above in reference to FIG. 1. One or more steps shown in FIG. 4A may be omitted, repeated, and/or performed in a different order among different embodiments of the invention. Accordingly, embodiments of the invention should not be considered limited to the specific number and arrangement of steps shown in FIG. 4A.

Initially, the local gateway receives a request for a cacheline from a cache agent of a requester cache (STEP 402). In one or more embodiments of the invention, the request is a P2P request and thus the request is received by both the gateway and the cache agents of the slave caches on the processor over the partially-ordered request network. In one or more embodiments of the invention, the request is a mediated request issued by the cache agent of the requester cache directly to the local gateway. The mediated request may be issued by the requester cache because a previous P2P request for the cacheline failed due to conflict or because the processor lacks the adequate access rights to the cacheline needed by the requester cache. Example mediated request include mRTS (i.e., request for read access to a cacheline) and mRTO (i.e., request for read/write access to a cacheline).

Upon receiving the request for the cacheline, the local gateway attempts to determine if the local processor is holding the cacheline in a suitable state (STEP 406). When the local gateway determines that the local processor holds the cacheline in a suitable state, the process proceeds to STEP 414. However, when the gateway determines that the local processor does not hold the cacheline in a suitable state or when the gateway cannot determine whether the local processor holds the cacheline in a suitable state (STEP 406), the process proceeds to STEP 407.

As discussed above, in one or more embodiments of the invention, the local gateway maintains a gateway tag for the cacheline. The gateway tag indicates the inter-processor state of the cacheline in the local processor. Accordingly, the gateway may be able to determine whether the local processor is holding the cacheline in a suitable state by accessing the gateway tag for the cacheline. However, in the absence of gateway tags or in the absence of the associated ESI state on the existing gateway tag for the cacheline, the local gateway may be unable to determine whether the local processor holds the cacheline in a suitable state. In the absence of ESI state, the local gateway can tell whether the local processor holds the line in a state suitable for pRTS, For pRTO, it can only tell that it doesn't hold the line in a suitable state if the gateway tags indicate that the cacheline is not held.

In STEP 407, an inter-processor request (e.g., RTO for mRTO or pRTO, RTS for mRTS or pRTS) is issued. The inter-processor request may be issued because: (i) the local gateway does not maintain a gateway tag for the cacheline and thus the local gateway was unable to determine whether the local processor holds the cacheline in a suitable state; or (ii) the local gateway does maintain a gateway tag for the cacheline and the gateway tag indicated that the local processor did not hold the cacheline in a suitable state and/or the gateway tag lacked the associated ESI state. Assuming an inter-processor protocol with a precise directory is in place so that the set of processors holding each cacheline is precisely known, the inter-processor request will return an acknowledgment if the processor already holds the cacheline.

In STEP 408, after the inter-processor request is issued, the local gateway receives a suitable inter-processor state from memory or from a foreign slave cache on a foreign processor. Cacheline data may also be received if the processor does not already hold the data.

For RTS, the local gateway can supply DataS to the cache agent of the requester cache (STEP 410). The data return could include an indication of whether the processor is becoming the exclusive holder of the cacheline, allowing the local gateway to supply DataE. The protocol might require the processor to take a modified copy. For RTO, a similar interaction is possible, but in this case the data always indicates an exclusive copy and could indicate that the processor needs to make its copy modified. Accordingly, any data supplied by the local gateway to the requester cache would be either DataE or DataM (STEP 410).

In STEP 414, the local gateway broadcasts a local forwarded request to the slave caches on the local processor over the partially-ordered request network. STEP 414 is executed, for example, when the request is a mediated request and it is determined from the gateway tags that the processor holds the cacheline in the required intra-processor state. STEP 414 is executed, for example, when the inter-processor request returns an acknowledgement. Table 5.1 in FIG. 5 shows two possible local forwarded requests. In the case of RTS, fRTS is broadcast. In the case of RTO, fRTO is broadcast.

In STEP 416, the cache agents of the slave caches receive the local forwarded request for the cacheline over the partially-ordered request network. The cache agents of the slave caches may respond directly to the cache agent of the requester cache. Each response is based on the current intra-processor state of the cacheline in the slave cache. Moreover, the intra-processor state of the cacheline in the slave cache is updated based on the type of the local forwarded request and the current intra-processor state. Table 5.2 in FIG. 5 shows the response by a cache agent of a slave cache to a local forwarded request and the subsequent update to the intra-processor state. For example, if the local forwarded request is fRTS and the current intra-processor of the cacheline in the slave cache is $Q_C$, the cache agent of the slave cache responds with DataS, and the new intra-processor state of the cacheline in the slave cache is set to $S_C$.

In STEP 412, the cache agent of the requester cache installs, if data is received, the cacheline data in the requester cache and updates the intra-processor state of the cacheline in the requester cache.

As discussed above, an acknowledgment may be received by the local gateway in response to RTO. In this case, the acknowledgement always indicates an exclusive copy and could indicate that the processor needs to make its copy modified. In addition to broadcasting fRTO, the local gateway also forwards AckE or AckM to indicate the modified status. If the cacheline is held in state O by the local processor, the requesting cache combines the exclusivity carried in AckE from the gateway with the modified status supplied by DataO from fRTO to install the cacheline in state M.

In one or more embodiments of the invention, with respect to STEP 402, instead of a cache sending an explicit mediated request after the failure of a P2P request, the gateway can be included in the broadcast of the P2P request over the partially-ordered request network. It can then be informed of the success or failure of the peer-to-peer request, either via an explicit packet sent from the requesting cache or by the gateway also receiving the responses to the cache and independently determining success or failure. Upon detecting failure the gateway behaves as if it had received an explicit mediated request.

In one or more embodiments of the invention, the gateway issues only one forwarded request per cacheline at a time, waiting for all responses to be received before issuing another request for the same cacheline. In one or more embodiments of the invention, when the cache agents of the caches can store more than one forwarded request per cacheline and the partially-ordered request network maintains forwarded request ordering between the gateway and each cache agent, the gateway may issue multiple forwarded requests for the same cacheline before the first forwarded request is complete.

Figure 4B:
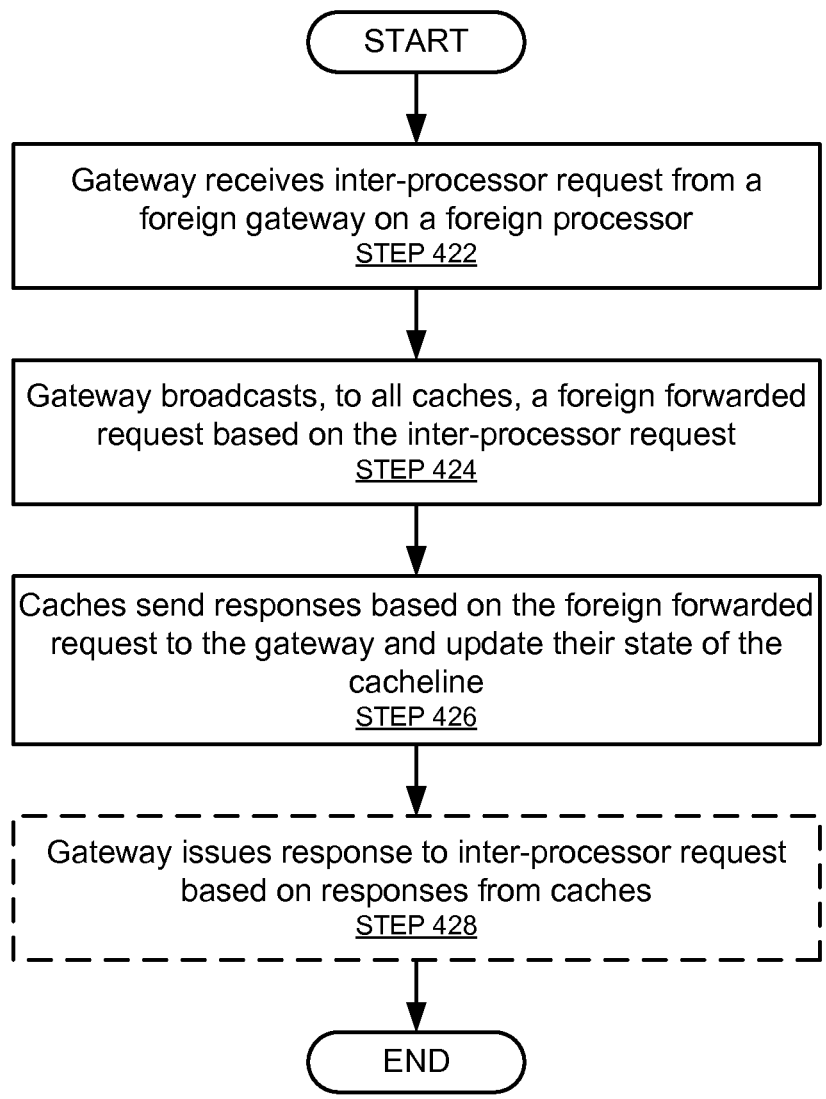

FIG. 4B shows a flowchart in accordance with one or more embodiments of the invention. The flowchart in FIG. 4B describes a foreign forwarded request for a cacheline. The process shown in FIG. 4B may be executed, for example, by one or more components in system (100), discussed above in reference to FIG. 1. One or more steps shown in FIG. 4B may be omitted, repeated, and/or performed in a different order among different embodiments of the invention. Accordingly, embodiments of the invention should not be considered limited to the specific number and arrangement of steps shown in FIG. 4B.

Initially, a local gateway receives an inter-processor request for a cacheline from a foreign gateway on a foreign processor (STEP 422). The inter-processor request is issued by the foreign gateway because the foreign processor does not have the cacheline in the required intra-processor state needed by a requester cache or a DMA on the foreign processor. Example inter-processor requests include RTS, RTO, cacheline invalidation requests, and a read-once snapshot of the cacheline.

In STEP 424, the local gateway broadcasts, to all caches on the local processor over the partially-ordered request network, a foreign forwarded request for the cacheline. The type of foreign forwarded request is dependent on the type of inter-processor request received by the local gateway. Table 5.3 in FIG. 5 shows various foreign forwarded requests for various types of inter-processor requests. For example, fCPI for a cacheline may be broadcasted by the local gateway to service an inter-processor request RTO for the cacheline.

In STEP 426, the cache agent of each local cache issues a response to the foreign forwarded request and/or updates the intra-processor state of the cacheline in the local cache. The response and new intra-processor state is based on the type of the foreign forwarded request and/or the current intra-processor state of the cacheline in the cache. Table 5.4 in FIG. 5 shows various responses by a cache in response to a foreign forwarded request. For example, as shown in FIG. 5.4, if the current intra-processor state of the cacheline in the local cache is $R_C$, and the foreign forwarded request is type fCPB, the response issued by the cache agent of the local cache is DataO. Table 5.5 shows the new intra-processor state of the cacheline in the local cache based on the type of foreign forwarded request and the current intra-processor state of the cacheline. For example, as shown in Table 5.5, if the foreign forwarded request is type fCPB, and the current intra-processor state of the cacheline is $E_C$, the new intra-processor state of the cacheline is set to $S_C$.

In STEP 428, once the local gateway receives the responses from the local caches, the local gateway issues a response to the inter-processor request. In one or more embodiments of the invention, when the local gateway stores a gateway tag for the cacheline, the gateway tag is updated to reflect the new inter-processor state of the cacheline on the local processor.

As shown in Table 5.5, unlike the other foreign forwarded requests, fCPB and fCPD leave any cacheline-supplying slave cache in a supplier state. This allows the cacheline to be transferred to another cache before that cache services the fCPB or fCPD. That other cache then also supplies the cacheline. In the case of fCPB, the first supplier loses any write access to the cacheline, so all the copies' data should match. This is not the case for fCPD, where intervening stores could change the cacheline's value. The gateway should choose just one of the data-carrying responses and discard the others.

As discussed above, the local gateway can use the gateway tags to determine that no inter-processor request is required upon P2P request failure and immediately proceed to issuing the corresponding forwarded request. However, the failure would have had to have been because of conflict, which is expected to be relatively rare. Falsely predicting the failure of a P2P request can lead to the delivery of the cacheline with no pending request to which to pass the cacheline.

For example, such a false failure prediction could occur if the gateway tags are invalidated or downgraded by a foreign request too early, so that a peer-to-peer request wins the race to the supplier cache and therefore succeeds, but by the time the gateway sees the peer to peer request, the gateway tags have been invalidated or downgraded, thus triggering an early inter-processor request.

Figure 4C:
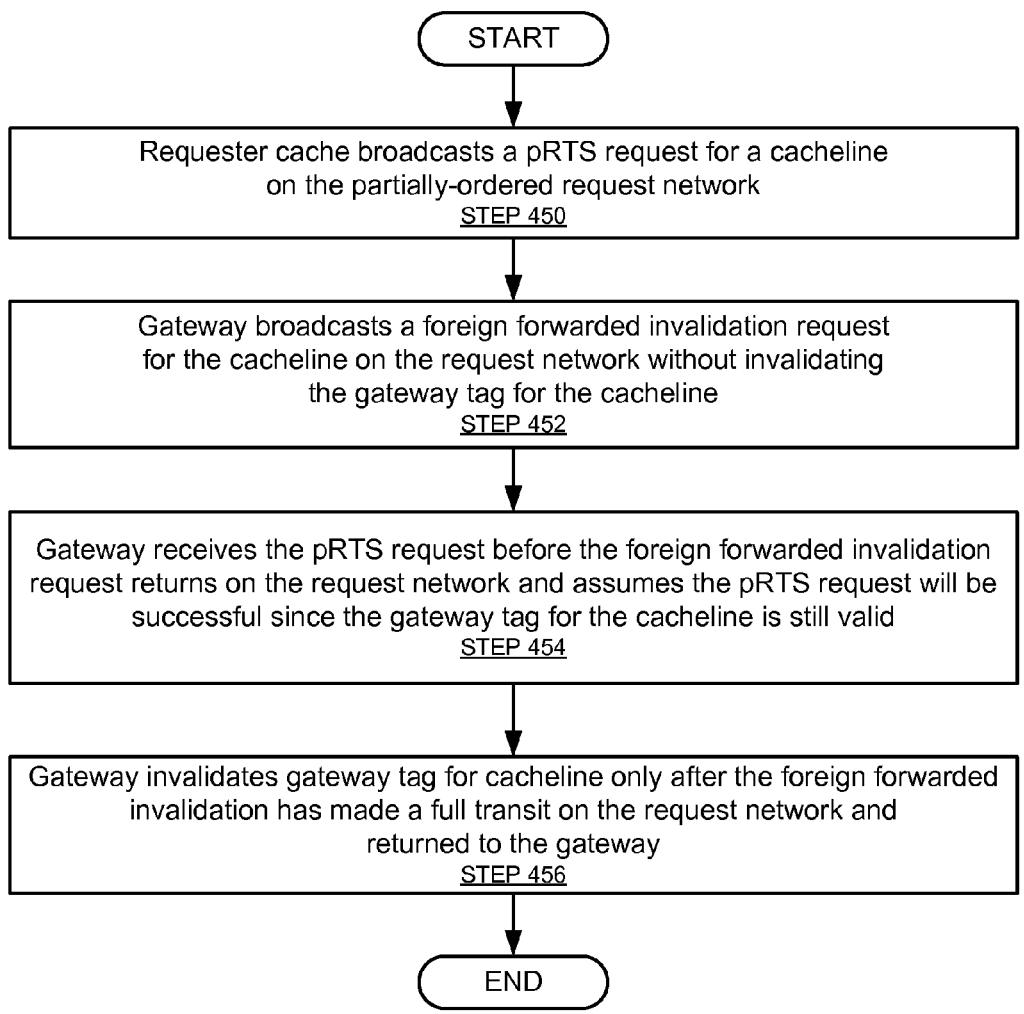

FIG. 4C shows a flowchart in accordance with one or more embodiments of the invention. The flowchart in FIG. 4C describes a resolution for the false P2P failure prediction by the local gateway. The process shown in FIG. 4C may be executed, for example, by one or more components in system (100), discussed above in reference to FIG. 1. One or more steps shown in FIG. 4C may be omitted, repeated, and/or performed in a different order among different embodiments of the invention. Accordingly, embodiments of the invention should not be considered limited to the specific number and arrangement of steps shown in FIG. 4C.

Initially, the cache agent of the requester cache broadcasts a P2P request (e.g., pRTS) for a cacheline on the partially-ordered request network (STEP 450). The partially-ordered request network has the ordering property that if a requester sees its own request A before another request B for the same cacheline, then no agent sees request B before request A. One possible network with this ordering property is a unidirectional ring.

In STEP 452, the local gateway broadcasts a foreign forwarded invalidation request (fINV) for the cacheline on the partially-ordered request network (e.g., unidirectional ring) without invalidating the gateway tag for the cacheline. The fINV is in response to an inter-processor invalidation request for the cacheline received by the local gateway.

In STEP 454, the local gateway receives the P2P request (e.g., pRTS) over the partially-ordered request network before the return of the foreign forwarded invalidation request. Upon receiving the pRTS, the local gateway assumes pRTS will be successful since the gateway tag for the cacheline is still valid.

In STEP 456, the local gateway invalidates the gateway tag for the cacheline only after the fINV has made a full transit of the partially-ordered request network (e.g., unidirectional ring) and returned to the local gateway. As the gateway tag update for the foreign request is not performed until the gateway sees its own forwarded request (e.g., fINV) on the partially-ordered request network, a false failure prediction is avoided.

In one or more embodiments of the invention, a local or foreign forwarded request for a cacheline always succeeds. Assume that the inter-processor state for the cacheline is not I, so that at all times either a cache holds the cacheline in a supplier state or the cacheline is in transit via a state-carrying response. Moreover, assume that no cache supplies the cacheline because of bad luck concerning the time of arrival of the forwarded request at the caches with respect to the cacheline being forwarded between caches via peer-to-peer requests. That implies that at some instant before the request is sent, some cache is the supplier for the cacheline and because the request fails to obtain the cacheline, some cache is the supplier at some instant after the request has finished.

Consider the entire history of the cacheline in the processors caches between the processor acquiring the cacheline (via the Gateway, necessarily before the forwarded request) and relinquishing it (via the Gateway, necessarily after the forwarded request). This history is represented as an (ordered) list of cache-[time] intervals representing when that cache is the supplier of that cacheline. The elements of the list can be classified as follows: (A) those elements for which the cache services the forwarded request after the time interval; and (B) those elements for which the cache services the forwarded request before the time interval.

Those skilled in the art, having the benefit of this detailed description, may perceive that the cacheline may never be relinquished by the processor, in which case the list may be infinitely long, or the last element of the list is a semi-interval instead of an interval. In the former case, the list can be truncated from the point where the intervals lie entirely after the completion of the forwarded request. The latter case supports the argument that follows.

The first element must be in class A; the last element must be in class B. There must be at least two caches X and Y corresponding to elements x and y in classes A and B respectively in the list such that x and y are adjacent (X directly supplies the cacheline to Y). So X services the forwarded request after relinquishing the cacheline and Y services the forwarded request before receiving the cacheline.

However, for Y to service the request before receiving the cacheline, it must send its peer-to-peer request for the cacheline after seeing the forwarded request, otherwise the servicing of the forwarded request would be delayed until its request has finished. Because its request was sent after receiving the forwarded request, X must also see Y's request after seeing the forwarded request (by the ordering properties of the request network), so X must see the forwarded request before it relinquishes the cacheline to Y, so X cannot be in class A. So the bad luck assumption is contradicted and therefore cannot hold Mediated Requests A cache sends an allocating mediated request to the gateway in order to obtain access rights to a cacheline. Unlike P2P requests, mediated requests are guaranteed to succeed. The detailed actions performed by the gateway is strongly dependent on the inter-processor coherence protocol.

As discussed above in reference to FIG. 4A, examples of mediated requests include: (1) a mediated request for read access to a cacheline (mRTS); (2) a mediated request for read-write access to a cacheline (mRTO); and (3) a mediated writeback (discussed below).

As also discussed above, the P2P protocol ensures that a cache state indicating that the cache is the sole holder of the cacheline within the processor does ensure that no other cache on the processor holds the cacheline. Crucial to the argument is that once a cache has been invalidated by a pRTO, it can only regain the cacheline by issuing a peer-to-peer request and that peer-to-peer request is ordered after the pRTO at all caches by the request network ordering property.

Mediated requests provide a "backdoor" for obtaining a cacheline without issuing a P2P request. Mediated requests without restriction or modification to the protocol can break the intra-processor exclusivity property.

Consider the following scenario involving three caches: Cache A, Cache B, and Cache C issuing concurrent requests to the same cacheline. No cache initially holds the cacheline. Cache A is performing a pRTO. Cache B is performing a pRTS. Cache C is performing a mRTO (an mRTS would make no difference).

The following sequence of events ensues:
1. Cache B sends pRTS.
2. Cache A sends pRTO.
3. Cache C responds to pRTO with Ack.
4. Cache C sends mRTO.
5. Gateway processes mRTO, sending DataE to cache C.
6. Cache C receives DataE and installs it in state $E_C$.
7. Cache C responds to pRTS with DataE, downgrading its state to $S_C$.
8. Cache A responds to pRTS with Nack.
9. Cache B receives responses, installing cacheline in state $X_C$.
10. Cache B responds to pRTO with DataE, downgrading its state to $I_C$.
11. Cache A receives responses, installing cacheline in state $E_C$.

There now exists a cache in state $E_C$, with another cache in state $S_C$, in violation of the exclusivity property.

One possible fix is to not allow mediated requests to be sent from intra-processor state $I_C$ unless a P2P request is sent first and any other P2P request (by/from another cache agent) is negatively acknowledged until the mediated request is complete. Another fix is more subtle. Note that cache B issues a pRTS; pRTO would not have this effect, because it would invalidate cache C. Although there could be a chain of requests to generate similar counterexamples (involving more caches), one request in the chain must be a pRTS in order to transfer the cacheline while leaving the supplier in state $S_C$.

The pRTO is later in the "supplier chain" than the pRTS, so the pRTS must receive all its responses before the pRTO completes. Also the pRTS must be serviced at the requester of the pRTO after the pRTO has been sent; if the pRTS were serviced before the pRTO was sent, then the pRTS would be seen before the pRTO at all caches (by the network ordering property). The pRTS would not be able to leave a cache in state $S_C$ after that cache had responded to the pRTO (for this to happen, the pRTO has to be seen before the pRTS).

It is therefore established that the pRTO requester services the pRTS while the pRTO is pending. If we have that servicing also cancel the final update specified in Table 3.5 in FIG. 3B (i.e., STEP 314 is skipped), then the pRTO fails (in the example enters state $X_C$ rather than state $E_C$) and the exclusivity property is not violated.

Victimization and Writebacks

When a cache entry is required to store a cacheline and there is no suitable free entry, the contents of an entry needs to be evicted. This eviction is referred to as "victimization". If the evicted cacheline's data is transferred elsewhere, then that victimization is a writeback. From the point of view of the protocol definition, the reason for the victimization is ignored.

Figure 6A:
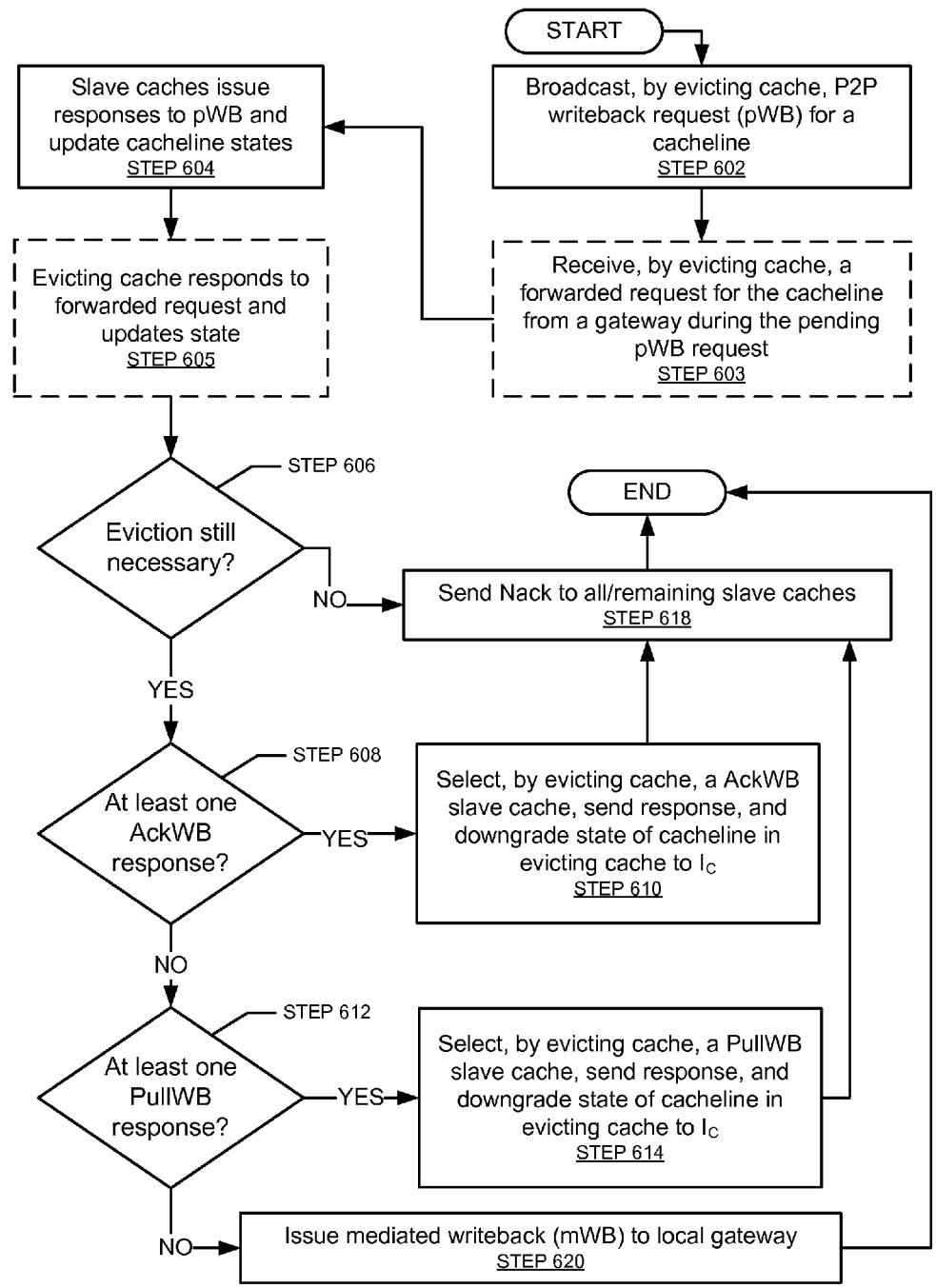
FIG. 6A and FIG. 6B show flowcharts in accordance with one or more embodiments of the invention.

FIG. 6A shows a flowchart in accordance with one or more embodiments of the invention. The process shown in FIG. 6A corresponds to a victimization and possible writeback. The process shown in FIG. 6A also shows an interaction between the eviction process and a forwarded request for the cacheline. The process shown in FIG. 6A may be executed, for example, by one or more components in system (100), discussed above in reference to FIG. 1. One or more steps shown in FIG. 6A may be omitted, repeated, and/or performed in a different order among different embodiments of the invention. Accordingly, embodiments of the invention should not be considered limited to the specific number and arrangement of steps shown in FIG. 6A.

Initially, the cache agent for the evicting cache broadcasts a P2P writeback request (pWB) for the cacheline over the partially-ordered request network to the slave caches on the local processor (STEP 602). As discussed above, the trigger for STEP 602 may be the lack of a suitable free entry in the evicting cache. Moreover, the evicting cache may have previously been the requesting cache and the eviction is necessary to store the recently acquire cacheline. If a cache holds a cacheline in state $S_C$ it may silently downgrade the state to $I_C$. This effectively frees up the entry, and it is no longer necessary to execute the process shown in FIG. 6A. However, If the evicting cache holds the cacheline in a supplier state, then silent victimization is not permitted.

In STEP 603, the cache agent of the evicting cache receives a forwarded request for the cacheline. The forwarded request is from the local gateway on the processor (the cache agent has no control over when forwarded requests are received). Moreover, the forwarded request is received while the pWB for the cacheline is still pending. The cache agent of the evicting cache may store the forwarded request for later processing (i.e., the cache agent delays responding to the forwarded request).

In STEP 604, each cache agent of a slave cache on the local processor issues a response to the pWB request and/or updates the intra-processor state of the cacheline in the slave cache. The response to the pWB is based on the current intra-processor state of the cacheline in the slave cache. Table 6.1 in FIG. 6C shows possible responses to the pWB by the cache agent of the slave cache. For example, as shown in FIG. 6.1, if the slave cache holds the cacheline in intra-processor state $S_C$, the cache agent of the slave cache may issue an acknowledgement writeback (AckWB) in response to the pWB. Both AckWB and PullWB propagate on the partially-ordered request network. The new intra-processor state of the cacheline in the slave cache is set to $S_C$.

In STEP 605, once all the responses are received from the slave caches, the evicting cache responds to the forwarded request (discussed above in reference to FIG. 4A and FIG. 4B). Those skilled in the art, having the benefit of this detailed description, will appreciate that STEP 605 is tied to STEP 603, and thus STEP 605 may be optional.

In STEP 606, it is determined whether the eviction of the cacheline is still necessary. Specifically, the forwarded request may have changed the intra-processor state of the cacheline to be evicted to $S_C$ or $I_C$. As discussed above, if a cache holds a cacheline in state $S_C$, it may silently downgrade the state to $I_C$. When it is determined that eviction is no longer necessary, the process proceeds to STEP 618. However, when it is determined that eviction of the cacheline from the evicting cache is still necessary, the process proceeds to STEP 608.

In STEP 608, it is determined whether at least one AckWB to the pWB was received from the cache agent of a slave cache over the partially-ordered request network. When it is determined that at least one AckWB was received, the process proceeds to STEP 610. When it is determined that no AckWB response was received, the process proceeds to STEP 612.

In STEP 612, it is determined whether at least one PullWB response to the pWB was received from the cache agent of a slave cache over the partially-ordered request network. When it is determined that at least one PullWB was received, the process proceeds to STEP 614. When it is determined that no PullWB response was received, the process proceeds to STEP 620.

A pWB fails if it receives Nacks from every slave cache on the processor. To ensure forward progress the evicting cache can issue a mediated writeback (mWB) to the gateway (STEP 620). As for mediated allocating requests, this may be done implicitly by the gateway being informed of the failure of the pWB. Unlike allocating mediated requests, a mediated writeback may only be issued from states $M_C$, $R_C$, $E_C$ or $P_C$ (i.e., when the evicting cache is in a supplier state and no other cache in the processor holds the cacheline).

Supporting a mediated writeback in other supplier states would require either the invalidation of the cacheline in the other caches (more complexity), or would require the gateway to broadcast a forwarded writeback. The gateway performs whatever is required in the inter-processor protocol, such as writing the cacheline back to memory if the cacheline is modified (inter-processor states M or O).

In STEP 614, if more than one PullWB responses are received over the partially-ordered request network, the cache agent of the evicting cache selects a slave cache that issued a PullWB, sends a response to the selected slave cache, and downgrades the cacheline in the evicting cache to intra-processor state $I_C$. The response sent to the selected slave cache is dependent on the intra-processor state of the cacheline in the evicting cache prior to the downgrade. Table 6.2 in FIG. 6C shows the response sent to the selected slave cache for different intra-processor states. For example, if the evicting cache holds the cacheline in $D_C$ the cache agent of the evicting cache sends DataM to the selected slave cache.

In STEP 610, if more than one AckWB responses are received over the partially-ordered request network, the cache agent of the evicting cache selects a slave cache that issued an AckWB, sends a response to the selected slave cache, and downgrades the cacheline in the evicting cache to intra-processor state $I_C$. The response sent to the selected slave cache is dependent on the intra-processor state of the cacheline in the evicting cache prior to the downgrade. Table 6.2 in FIG. 6C shows the response sent to the selected slave cache for different intra-processor states. For example, if the evicting cache holds the cacheline in $O_C$, the cache agent of the evicting cache sends AckO to the selected slave cache.

In STEP 618, a Nack is sent to the cache agents of all slave caches that were not selected.

In view of FIG. 6A, the cache agent of the evicting cache waits only for the reception of the responses and then responds to a received forwarded request and makes any required state change before responding to any AckWB or PullWB received after the forwarded request. The reason for delaying a response to a forwarded request while a pWB is pending is to ensure that only one pWB is active per cacheline on the processor. Having multiple pWBs active for the same cacheline causes problems if a cache that has replied with AckWB to the first pWB does not have the resources for doing the same for the second. It is required to invalidate its cacheline to respond with Nack, but is forbidden to invalidate its cacheline with an outstanding AckWB. It is possible to work around this issue by other means, but it seems better to slow down a rare corner case rather than complicate the protocol.

Figure 6B:
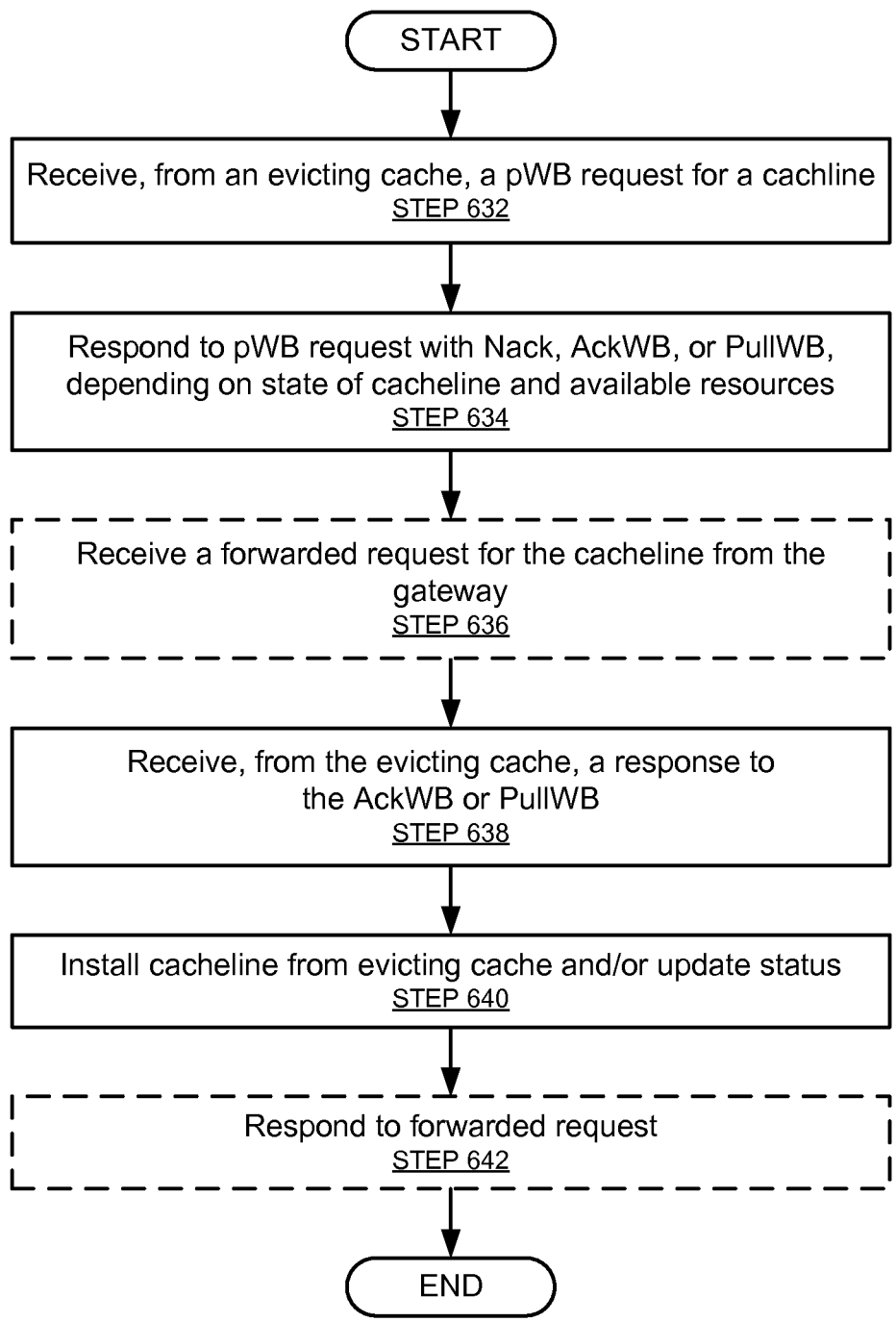

FIG. 6B shows a flowchart in accordance with one or more embodiments of the invention. The process shown in FIG. 6B describes the actions taken by a slave cache during a victimization and possible writeback. The process shown in FIG. 6B also describes an interaction between the eviction process and a forwarded request for the cacheline. The process shown in FIG. 6B may be executed, for example, by one or more components in system (100), discussed above in reference to FIG. 1. One or more steps shown in FIG. 6B may be omitted, repeated, and/or performed in a different order among different embodiments of the invention. Accordingly, embodiments of the invention should not be considered limited to the specific number and arrangement of steps shown in FIG. 6B.

Initially, a P2P writeback request (pWB) for a cacheline is received by the cache agent of a slave cache over the partially-ordered request network. As discussed above, the pWB is issued when the evicting cache lacks a suitable free entry.

In STEP 634, the cache agent of the slave cache responds to the pWB with Nack, AckWB, or PullWB over the partially-ordered request network depending on the intra-processor state of the cacheline in the slave cache. Moreover, the intra-processor state of the cacheline in the slave cache is updated in response to the pWB. Table 6.1 in FIG. 6C shows the various responses of the slave cache to the pWB and the new intra-processor state assigned to the cacheline. For example, as shown in Table 6.1, if the current intra-processor state of the cacheline in the slave cache is $I_C$ when the pWB is received, the cache agent of the slave cache may respond with a PullWB over the partially-ordered request network. The new state of the cacheline in the slave cache is still $I_C$.

In STEP 636, after the slave cache has responded to pWB over the partially-ordered request network, the slave cache receives a local or foreign forwarded request. The forwarded request is from the local gateway on the processor (as the forwarded request is issued by the local gateway, the cache agent of the slave cache has not control as to when a forwarded request arrives). Moreover, the forwarded request is received while the AckWB or PullWB for the cacheline is still pending. The cache agent of the slave cache may store the forwarded request for later processing (i.e., the cache agent delays responding to the forwarded request for the cacheline while the AckWB or PullWB for the cacheline is still pending).

In STEP 638, a response to AckWB or PullWB is received by the slave cache from the evicting cache. As shown in Table 6.2 in FIG. 6C, the response is based on the intra-processor state of the cacheline in the evicting cache. For example, the slave cache may receive AckM or DataE, from the evicting cache in response to AckWB and PullWB, respectively.

In STEP 640, in the case of a data response (e.g., DataM, DataO, DataE, DataS), the cacheline is installed in the slave cache. Moreover, for both data responses and acknowledgments (e.g., AckM, AckO, AckE, AckS), the intra-processor state of the cacheline in the slave cache is updated according to Table 6.3 in FIG. 6C.

In STEP 642, now that an AckWB or PullWB is no longer pending for the slave cache (i.e., the AckWB or PullWB is completed), the slave cache responds to the forwarded request.

In view of FIG. 3A, FIG. 6A, and FIG. 6B, any cache with an active P2P allocating request for the same cacheline responds to a pWB with Nack (making any state changes specified by Table 6.1 in FIG. 6C). Any cache with a pending pWB responds with Nack to a received P2P allocating request for the same cacheline in order to prevent a second concurrent pWB to the same cacheline. Any cache with a pending AckWB or PullWB responds with Nack to a received peer-to-peer allocating request.

Request to Write Whole Cache Line

If it is intended to write an entire cacheline, then it is wasteful of network bandwidth to transmit the original cacheline data to the writer's cache. A "pRTW" request, which merely transfers access rights between caches unaccompanied by cacheline data, does not work. If because of receiving a Nack or because of seeing a pRTS the requester is unable to obtain write access, the cacheline data is lost. A pRTW request must therefore behave exactly the same as a pRTO request. One reason for having a pRTW is to enable an automatic mRTW.

Provided the inter-processor protocol supports the transferring of write access without transferring the cacheline data, then mRTW can lead to reduction of inter-processor bandwidth requirements for whole cacheline writes.

Additional Operations Associated with Gateway Tags

As discussed above, in one or more embodiments of the invention, the gateway can use the gateway tags to accurately predict the failure of a peer-to-peer request and start the inter-processor servicing of the failure before seeing the failure indication from the peer-to-peer request itself. This can save the latency of peer-to-peer request processing in the total cache miss processing.

As also discussed above, in one or more embodiments of the invention, the gateway can also use the gateway tags to determine that no inter-processor request is required upon peer-to-peer request failure and immediately proceed to issuing the corresponding forwarded request. However, the failure would have had to have been because of conflict.

In one or more embodiments of the invention, with respect to gateway tag evictions, it may be impracticable to have the gateway tag structure precisely mirror the structure of the caches—the associativity of the Gateway tags may become excessive. Without sufficient associativity, it may not be possible to allocate a gateway tag entry when performing an allocating inter-processor request; in this case it may be necessary to evict another cacheline from the caches in order to make space in the gateway tags.

In one or more embodiments of the invention, this can be achieved by the gateway broadcasting an fCPI to the caches and storing the cacheline in a buffer in the gateway while the inter-processor writeback or victimization is performed (typical inter-processor protocols require that the cacheline be retained for possible access by other processors until the effect of the victimization is visible to other processor's requests).

In one or more embodiments of the invention, another approach is to force the supplier cache to initiate a victimization while suppressing the transfer of the cacheline to another cache on the processor (with a special pWBA variant of pWB).

Victim Cache Designation for pWB

In one or more embodiments of the invention, the processing of pWB can be quite expensive when multiple caches respond with PullWB and/or AckWB. Also issuing PullWB can pollute the PullWB issuer's cache. To mitigate this it is useful to be able to target the pWB at a specific cache, which is the only cache permitted to respond with PullWB.

A pWB variant, pWBA, can also suppress AckWB from every cache except the designated victim cache.

In one or more embodiments of the invention, it is also useful to be able to designate no victim cache at all, forcing all caches to Nack and invalidate any shared copies. This can be used in conjunction with mWB (i.e., mediated writeback) to force the cacheline out of all caches on the processor.

Figure 7:
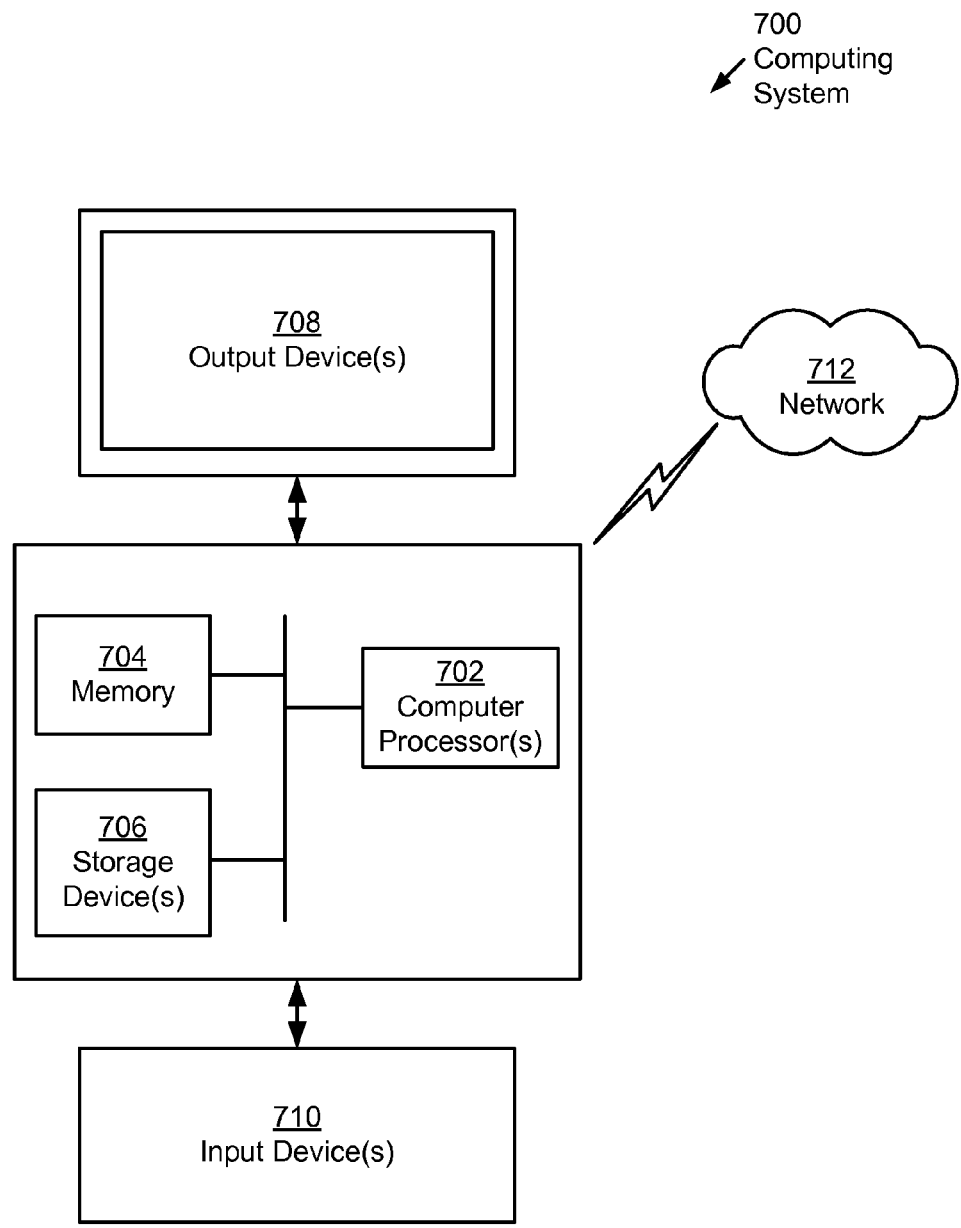
FIG. 7 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (714) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (714). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for cache coherence, comprising:
broadcasting, by a cache agent of a first requester cache (RC) over a partially-ordered request network of a local processor, a first peer-to-peer (P2P) request for a cacheline to a plurality of cache agents of a plurality of slave caches on the local processor;
receiving, by the cache agent of the first RC and over the partially-ordered request network while the first P2P request is pending, a forwarded request associated with the cacheline from a local gateway on the local processor,
wherein the local gateway is operatively connected to a foreign gateway on a foreign processor,
wherein the cache agent of the first RC delays responding to the forwarded request because the first P2P request is pending;
receiving, by the cache agent of the first RC and after receiving the forwarded request, a plurality of responses to the first P2P request from the plurality of cache agents of the plurality of slave caches;
setting, by the cache agent of the first RC and after receiving the plurality of responses, an intra-processor state of the cacheline in the first RC,
wherein the intra-processor state also specifies an inter-processor state of the cacheline associated with the local processor and the foreign processor; and
issuing, by the cache agent of the first RC, a response to the forwarded request after setting the intra-processor state and after the first P2P request is complete; and
modifying, by the cache agent of the first RC, the intra-processor state in response to issuing the response to the forwarded request.

2. The method of claim 1, further comprising:
receiving, by the local gateway, the first P2P request over the partially-ordered request network;
issuing, by the local gateway and in response to the local gateway being unable to determine whether the local processor holds the cacheline in an intra-processor state required by the first P2P request, an inter-processor request for the cacheline.

3. The method of claim 1, further comprising:
receiving, by the local gateway, the first P2P request over the partially-ordered request network; and determining, by the local gateway, that the local processor holds the cacheline by accessing a gateway tag for the cacheline.

4. The method of claim 3, further comprising:
receiving, by the local gateway, an inter-processor request to invalidate the cacheline from the foreign gateway;
broadcasting, by the local gateway and before the first P2P request is received, the forwarded request on the partially-ordered request network to the plurality of cache agents of the plurality of slave caches and the cache agent of the first RC,
wherein the forwarded request is a request to invalidate the cacheline;
receiving, by the local gateway and after receiving the first P2P request, a return of the forwarded request on the request network; and
invalidating, by the local gateway, the gateway tag after receiving the return of the forwarded request on the partially-ordered request network to prevent false prediction of failure of the first P2P request.

5. The method of claim 1, further comprising:
broadcasting, by a cache agent of a second RC on the local processor, a second P2P request over the partially-ordered request network for the cacheline;
identifying, by the cache agent of the second RC, a failure of the second P2P request;
issuing, by the cache agent of the second RC, a mediated request for the cacheline in response to identifying the failure of the second P2P request,
wherein the cache agent of the second RC is permitted to issue the mediated request for the cacheline when the second RC holds the cacheline in intra-processor state $I_C$ because the second RC broadcasted the second P2P request before issuing the mediated request and negatively acknowledges subsequent P2P requests for the cacheline until the mediated request is complete; and
issuing, by the local gateway, the forwarded request over the partially-ordered request network in response to receiving the mediated request.

6. The method of claim 5, wherein the response to the forwarded request issued by the cache agent of the first RC is received by the cache agent of the second RC.

7. The method of claim 1, further comprising:
deeming the first P2P request a failure in response to the cache agent of the requester cache receiving a P2P read access request (pRTS) for the cacheline while the first P2P request is pending, wherein the first P2P request is a read-write access request (pRTO) for the cacheline.

8. A method for cache coherence, comprising:
broadcasting, by a cache agent of an evicting cache (EC) over a partially-ordered request network on a local processor, a peer-to-peer (P2P) writeback request for a cacheline to a plurality of cache agents of a plurality of slave caches on the local processor;
receiving, by the cache agent of the EC over the partially-ordered request network and while the P2P writeback request is still pending, a first forwarded request for the cacheline from a local gateway on the local processor,
wherein the local gateway is operatively connected to a foreign gateway on a foreign processor, and
wherein the cache agent of the EC delays responding to the first forwarded request while the P2P writeback request is still pending to ensure that only one P2P writeback request is active for the cacheline on the local processor;
receiving, by the cache agent of the EC, a plurality of responses from the cache agents of the plurality of slave caches;

issuing, by the cache agent of the EC, a response to the first forwarded request after receiving the plurality of responses from the cache agents of the plurality of slave caches and after the P2P writeback request is complete; and issuing, by the cache agent of the EC and after issuing the response to the first forwarded request, a plurality of responses to the cache agents of the plurality of slave caches.

9. The method of claim 8, wherein the first forwarded request is an invalidation request, and wherein the plurality of responses to the cache agents of the plurality of slave caches are all negative acknowledgements (Nacks).

10. The method of claim 8, further comprising:
identifying, by the cache agent of the EC, a pull writeback (PullWB) from a first slave cache in the plurality of responses from the cache agents of the plurality of slave caches.

11. The method of claim 10, further comprising:
identifying, by the cache agent of the EC, an acknowledgement writeback (AckWB) from a second slave cache in the plurality of responses from the cache agents of the plurality of slave caches,
wherein the plurality of responses to the cache agents of the plurality of slave caches comprises:
a type of positive acknowledgement for a cache agent of the second slave cache based on an intra-processor state of the cacheline in the EC; and
a negative acknowledgement (Nack) for a cache agent of the first slave cache.

12. The method of claim 10, wherein the plurality of responses to the cache agents of the plurality of slave caches comprises the cacheline based on an inter-processor state of the cacheline in the EC for a cache agent of the first slave cache.

13. The method of claim 8, further comprising:
receiving, by a cache agent of a slave cache of the plurality of slave caches, the P2P writeback request over the partially-ordered request network;
issuing, by the cache agent of the slave cache and based on an intra-processor state of the cacheline in the slave cache, an acknowledgement writeback (AckWB) to the P2P writeback request over the partially-ordered request network;
receiving, by the cache agent of the slave cache over the partially-ordered request network, the first forwarded request while the AckWB is pending,
wherein the cache agent of the slave cache delays responding to the first forwarded request while the AckWB is pending;
receiving, by the cache agent of the slave cache and after receiving the first forwarded request, a type of positive acknowledgement from the cache agent of the EC;
updating, by the cache agent of the slave cache and based on the type of positive acknowledgement, the intra-processor state of the cacheline in the slave cache; and
responding, by the cache agent of the slave cache, to the first forwarded request after updating the intra-processor state and after the AckWB is complete.

14. The method of claim 8, further comprising:
receiving, by a cache agent of a slave cache of the plurality of slave caches, the P2P writeback request over the partially-ordered request network;
issuing, by the cache agent of the slave cache and based on an intra-processor state of the cacheline in the slave cache, a pull writeback (PullWB) to the P2P writeback request over the partially-ordered request network;

receiving, by the cache agent of the slave cache, a second forwarded request for the cacheline over the partially-ordered request network while the PullWB is pending, wherein the second forwarded request is from the local gateway,
wherein the cache agent of the slave cache delays responding to the second forwarded request because the PullWB is pending;
receiving, by the cache agent of the slave cache and after receiving the second request, the cacheline from the cache agent of the EC;
installing, by the cache agent of the slave cache, the cacheline from the cache agent of the EC in the slave cache; and
responding, by the cache agent of the slave cache, to the second forwarded request after installing the cacheline.

15. A system for cache coherence, comprising:
a foreign processor; and
a local processor comprising:
a plurality of cache agents of a plurality of local slave caches;
a first partially-ordered request network operatively connecting the plurality of cache agents of the plurality of local slave caches; and
a cache agent of a requester cache (RC) configured to:
broadcast a peer-to-peer (P2P) request for a first cacheline over the first partially-ordered request network to the plurality of cache agents of the plurality of local slave caches;
receive, while the P2P request is pending, a forwarded request associated with the first cacheline over the partially-ordered request network;
set, in the RC and after the forwarded request is received, an intra-processor state of the cacheline based on a response to the P2P request,
wherein the intra-processor state also specifies an inter-processor state of the cacheline associated with the local processor and the foreign processor; and
issue a response to the forwarded request after the intra-processor state is set and after the P2P request is completed,
wherein the response to the forwarded request is delayed while the P2P request is pending.

16. The system of claim 15, wherein the local processor further comprises:
a local gateway comprising a gateway tag corresponding to the first cacheline,
wherein the gateway tag is used by the local gateway to determine that the local processor holds the first cacheline.

17. The system of claim 16, wherein the foreign processor comprises:
a foreign gateway operatively connected to the local gateway;
a plurality of cache agents for a plurality of foreign slave caches; and
a second partially-ordered request network operatively connecting the foreign gateway and the plurality of cache agents of the plurality of foreign slave caches,
wherein the foreign gateway is configured to issue an inter-processor invalidation request for the first cacheline to the local gateway,
wherein the local gateway issues the forwarded request on the first partially-ordered request network in response to the inter-processor invalidation request, and wherein the local gateway invalidates the gateway tag after seeing a return of the forwarded request on the first partially-ordered request network, wherein the first partially-ordered request network and the second partially-ordered request network are unidirectional rings.

18. The system of claim 15, wherein the local processor further comprises:
    a local gateway configured to:
        receive the P2P request over the first partially-ordered request network; and
        issue, in response to being unable to determine whether the local processor holds the first cacheline in an intra-processor state required by the P2P request, an inter-processor request for the first cacheline to the foreign processor.

19. The system of claim 15, wherein the cache agent of the RC is further configured to:
    deem the P2P request a failure in response to receiving a P2P read access request (pRTS) for the first cacheline while the P2P request is pending, wherein the P2P request is a read-write access request (pRTO) for the first cacheline.

20. The system of claim 15, wherein the cache agent of the RC issues a mediated writeback to evict a second cacheline stored in the RC.

* * * * *

UNITED STATES PATENT AND TRADEMARK OFFICE
CERTIFICATE OF CORRECTION

PATENT NO. : 8,972,663 B2
APPLICATION NO. : 13/830967
DATED : March 3, 2015
INVENTOR(S) : Loewenstein et al.

It is certified that error appears in the above-identified patent and that said Letters Patent is hereby corrected as shown below:

Specification

In column 4, line 55, delete "160Y)" and insert -- 160Y). --, therefor.

In column 5, line 52, delete "$S_C$" and insert -- $S_C$, --, therefor.

In column 13, line 6, delete "hold" and insert -- hold. --, therefor.

In column 14, line 43, delete "$S_C$" and insert -- $S_C$, --, therefor.

In column 15, line 57, delete "$D_C$" and insert -- $D_C$, --, therefor.

Signed and Sealed this
Twenty-seventh Day of October, 2015

Michelle K. Lee
*Director of the United States Patent and Trademark Office*